(12) United States Patent
Klein et al.

(10) Patent No.: US 12,112,074 B2
(45) Date of Patent: Oct. 8, 2024

(54) MAINTAINING QUALITY OF SERVICE OF NON-VOLATILE MEMORY DEVICES IN HETEROGENEOUS ENVIRONMENT

(71) Applicant: Kioxia Corporation, Tokyo (JP)

(72) Inventors: Yaron Klein, Raanana (IL); Oded Ilan, Tel-Aviv (IL)

(73) Assignee: KIOXIA CORPORATION, Tokyo (JP)

( * ) Notice: Subject to any disclaimer, the term of this patent is extended or adjusted under 35 U.S.C. 154(b) by 0 days.

(21) Appl. No.: 17/706,975

(22) Filed: Mar. 29, 2022

(65) Prior Publication Data
US 2023/0315344 A1 Oct. 5, 2023

(51) Int. Cl.
*G06F 12/00* (2006.01)
*G06F 3/06* (2006.01)

(52) U.S. Cl.
CPC .......... *G06F 3/0664* (2013.01); *G06F 3/0619* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 2004/0049643 A1* | 3/2004 | Alavarez | G06F 11/1076 714/E11.034 |
| 2014/0195847 A1* | 7/2014 | Webman | G06F 3/067 714/6.22 |
| 2018/0121645 A1* | 5/2018 | Petersen | H04L 63/1441 |

OTHER PUBLICATIONS

Ries, E. et al. "Introducing Software-Enabled Flash (SEF) Technology" Apr. 2020. Kioxia Corporation.*

* cited by examiner

*Primary Examiner* — Daniel D Tsui
(74) *Attorney, Agent, or Firm* — Foley & Lardner LLP

(57) ABSTRACT

In some arrangements, a manager of a storage system determines at least one abstracted memory structure for a tenant using a non-volatile memory of at least one non-volatile storage device. The abstracted memory structure includes at least one hardware storage unit of the non-volatile memory of the at least one non-volatile storage device. The at least one abstracted memory structure includes one or more of at least one virtual device corresponding to an application of the tenant or at least one domain corresponding to a volume of the application of the tenant. A virtual device mapping that maps the application of the tenant to the at least one hardware storage unit corresponding to the at least one virtual device is determined. A domain mapping that maps the volume to the at least one hardware storage unit corresponding to the at least one domain is determined.

21 Claims, 6 Drawing Sheets

MAINTAINING QUALITY OF SERVICE OF NON-VOLATILE MEMORY DEVICES IN HETEROGENEOUS ENVIRONMENT

TECHNICAL FIELD

The present disclosure relates generally to non-volatile memory storage device such as Solid State Drives (SSDs), and in particular, to Software Enabled Flash (SEF) devices populated in a cluster and managed by a software entity (provisioner).

BACKGROUND

Heterogeneous environments of a datacenter that support multiple users and applications pose new challenges to the storage layer. For example, as the number of users and applications increase, service level or Quality of Service (QoS) for an application may degrade. The QoS can be defined in terms of latency, tail latency, and performance (e.g., Input/Output Per Second (IOPS)) for an application. In addition, Software-Defined-Storage ("SDS") solutions, which are software applications managing hardware storage layers, suffer from similar challenges.

The degradation of service level in these scenarios is caused by software-hardware separation. Hardware is unaware of tenants' placement of data on the non-volatile memory storage. As such, the same die in an SSD may host or store data for multiple tenants, causing write and read commands to share the same write or read queue. The sharing of the queues delay access to the die and enlarge tail latency. Furthermore, the impact is compounded as noisy neighbors sharing the same die affect each other's performance. In other words, the die and the queue corresponding thereto are the bottlenecks regardless of the optimization performed externally outside of the hardware.

Conventionally, software observes and treats drives (e.g., Solid State Drives (SSDs)) as "flat" media without considering the construction of the drives. Traditional placement logic may consider layouts such as stripe or Redundant Array of Independent Disks (RAID) but not any layouts for NAND flash drives such as structures related to Garbage Collection (GC), Write Amplification (WA), die, and so on.

SUMMARY

Arrangements disclosed herein relate to managing abstracted memory structures, including determining, by a manager, at least one abstracted memory structure for a tenant using a non-volatile memory of at least one non-volatile storage device. The abstracted memory structure includes at least one hardware storage unit of the non-volatile memory of the at least one non-volatile storage device. The at least one abstracted memory structure includes one or more of at least one virtual device corresponding to an application of the tenant or at least one domain corresponding to a volume of the application of the tenant. The manager includes at least one of a virtual device mapping that maps the application of the tenant to the at least one hardware storage unit corresponding to the at least one virtual device or a domain mapping that maps the volume to the at least one hardware storage unit corresponding to the at least one domain.

DETAILED DESCRIPTION

Figure 1:
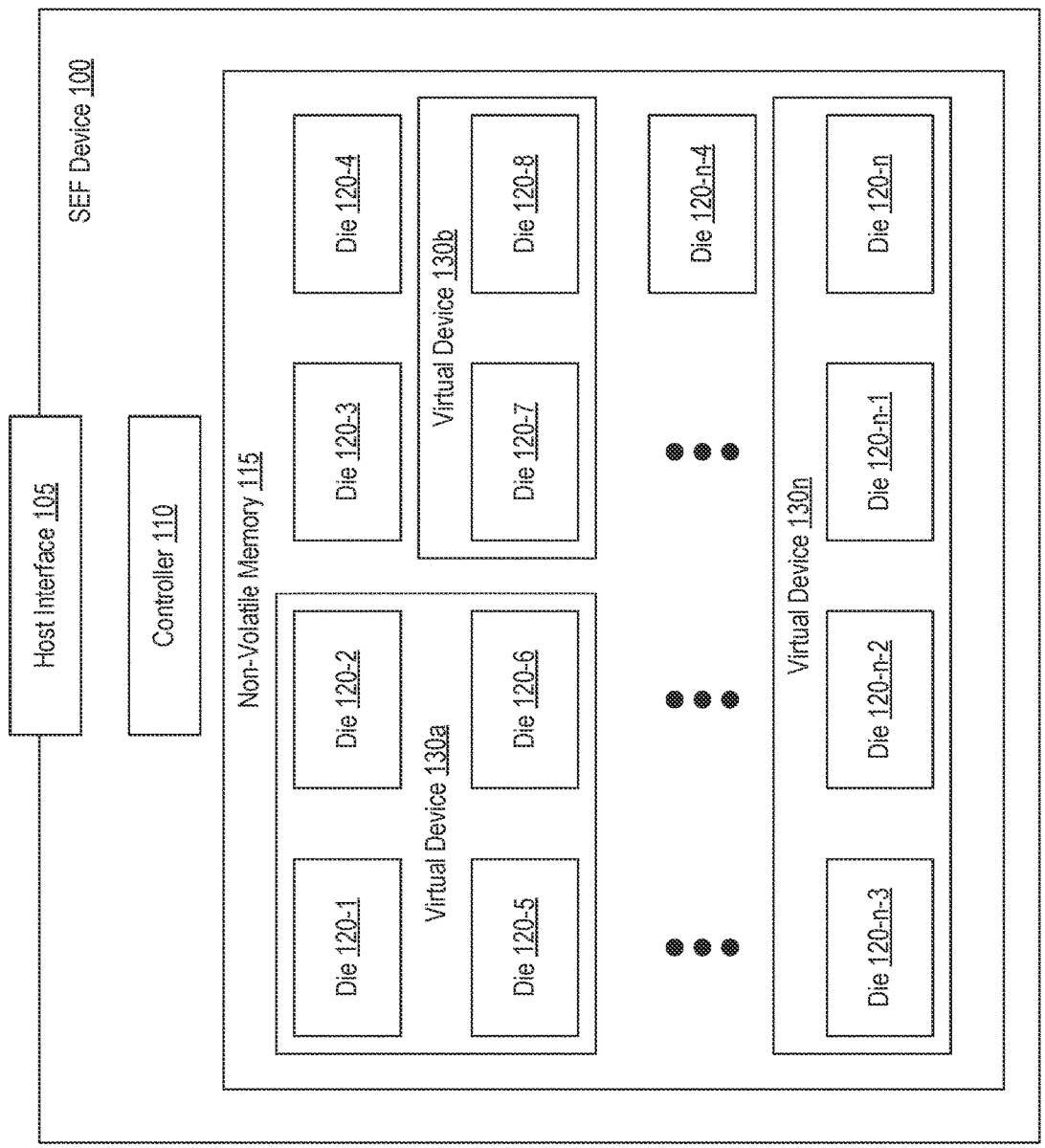
FIG. 1 is a diagram of an SEF device, according to various arrangements.

In some implementations, a storage node has a plurality of non-volatile memory storage devices (e.g., NVMe drives) and a software that manages these storage devices. A volume is mapped on the storage devices, either as a simple volume included in a same storage device, a concatenated volume that span over the multiple storage devices, a stripe volume that equally spans on storage devices, or a RAID with parity information for resiliency across storage devices.

In an example in which data for four applications is stored in four non-volatile memory storage devices, the volume for a first application resides entirely on a first non-volatile memory storage device. The volume for a second application is striped (e.g., using RAID-0) over all four of the non-volatile memory storage devices for high performance. The volume for a third application is concatenated over the first non-volatile memory storage device and the third non-volatile memory storage device given that none of the non-volatile memory storage devices has sufficient storage space to host the entirety of the data for the third application.

With regard to the first non-volatile memory storage device which stores data for the first, second, and third applications, although the volumes of those three applications are mapped consecutively to the first non-volatile memory storage device, portions of the volumes of those three applications are conventionally stored on all dies of the first non-volatile memory storage device. As a result, the high load of the second application may cause high tail latency for the first and third applications as the applications share the same dies. Moreover, as the first, second, and third applications all share the same queue, even application throttling at a software level external to the first non-volatile memory storage device fails to prevent certain commands to be inserted ahead in the queue, thus causing higher latency in other applications. For example, when a command associated with a large amount of data (e.g., over 1 MB) is served for the second application, the command would stall all other commands to the same die from other applications and thus increases the latency of other commands.

The arrangements disclosed herein relate to software-hardware interfaces for non-volatile memory devices (e.g., NAND drives) that improve QoS for host applications in a heterogeneous environment (e.g., in a datacenter with multiple tenants and applications). The arrangements further relate to the logic for managing a plurality of non-volatile memory devices within a storage node and across multiple nodes in a datacenter. In particular, some arrangements relate to a non-volatile memory storage devices referred to as Software Enabled Flash (SEF) devices or drives. A SEF devices can store data on its non-volatile storage (e.g., NAND memory). A host can access SEF devices based on NAND layout awareness instead of via abstract read and write commands of a consecutive logical address (e.g., Logical Block Address (LBA)) range. An SEF device provides for virtual devices and QoS domains that allow multi-tenant volumes to be allocated on the SEF devices. In addition, complementary software allocates multi-tenant volumes such that applications can meet corresponding service level.

In some arrangements, an example or basis of an SEF device is an open-channel device (e.g., an Open Channel SSD), which is described in U.S. Pat. No. 10,542,089 by Yaron Klein, titled "LARGE SCALE IMPLEMENTATION OF A PLURALITY OF OPEN CHANNEL SOLID STATE DRIVES," filed on Mar. 10, 2017, and U.S. Pat. No. 11,188,496 by Yaron Klein, titled "SYSTEM AND METHOD FOR STORING DATA USING ETHERNET DRIVES AND ETHERNET OPEN-CHANNEL DRIVES," filed on Sep. 13, 2018, the entire contents of which are incorporated herein by reference in their entirety.

In some examples, an open-channel device exposes its NAND interface to a host or another entity on a network for reading data, programing data, and erasing data. In some examples, an SEF device has an abstraction layer to offload part of the Flash Translation Layer (FTL) from the host to the SEF device, thus allowing a NAND-aware device without significant computation overhead of the FTL.

FIG. 1 is a diagram of an SEF device 100, according to various arrangements. Referring to FIG. 1, the SEF device 100 includes a host interface 105, a controller 110, and a non-volatile memory 115. Other components of the storage device 100 are not shown for brevity. The non-volatile memory 115 includes NAND flash memory devices. Each of the NAND flash memory devices includes one or more of the NAND flash dies 120-1, 120-2, ..., 120-n, which are non-volatile memory capable of retaining data without power. Thus, the NAND flash memory devices refer to multiple NAND flash memory devices or dies within the non-volatile memory 115. The non-volatile memory 115 can therefore be referred to a memory array of dies as shown. Each of the dies 120-1, 120-2, ..., 120-n has one or more planes. Each plane has multiple blocks, and each block has multiple pages.

The dies 120-1, 120-2, ..., 120-n can be arranged in memory communication channels connected to the controller 110. While the dies 120-1, 120-2, ..., 120-n are shown in FIG. 1, the non-volatile memory 115 can include any suitable number of non-volatile memory dies that are arranged in one or more channels in communication with the controller 110.

While the dies 120-1, 120-2, ..., 120-n are shown as an example implementation of the non-volatile memory 115, other examples of non-volatile memory technologies for implementing the non-volatile memory 115 include but are not limited to, Magnetic Random Access Memory (MRAM), Phase Change Memory (PCM), Ferro-Electric RAM (FeRAM), Resistive RAM (ReRAM), and so on, the physical layout can be made aware to the host as described herein.

In some arrangements, the SEF device 100 is coupled to a host via the host interface 105. In some examples, the host can be a user device operated by a user. The host may include an Operating System (OS), which is configured to provide a file system and applications that use the file system. The host interface 105 can be any suitable adaptor or standard interface such as but not limited to, Peripheral Component Interconnect Express (PCIe), Serial Attached SCSI (SAS), Serial ATA (SATA), Non-Volatile Memory Express (NVMe), and so on. The host interface 105 includes hardware (e.g., controllers) implemented on the SEF device 100 and software and/or firmware executed on the hardware.

The controller 110 can combine raw data storage in the dies 120-1, 120-2, ..., 120n such that those dies 120-1, 120-2, ..., 120n function as a single drive. In some arrangements, the controller 110 can perform error correction, caching, buffering, and encryption, as well as interfacing with the host through the host interface 105 over a suitable connection. The controller 110 can include processors, microcontrollers, Central Processing Units (CPUs), caches, buffers, error correction systems, data encryption systems, and so on. The controller 110 manages various features for the non-volatile memory 115, including but not limited to, Input/Output (I/O) handling, reading, writing/programming, erasing, monitoring, logging, error handling, garbage collection, wear leveling, data protection (encryption/decryption), and the like. Such functions can be implemented in hardware, software, and firmware or any combination thereof. In some arrangements, the software/firmware of the controller 110 can be stored in the non-volatile memory 115 or in any other suitable computer readable storage medium.

In contrast with a conventional open-channel device does not include an FTL, the SEF device 100 includes an abstraction layer as described herein that offloads at least a part of the FTL functionalities from the host as described herein.

In some arrangements, the non-volatile memory 115 can be segmented into multiple virtual devices. In some arrangements, a virtual device or virtual SSD is a memory structure abstracted from hardware storage units (e.g., die of the SEF devices) that can be defined by a manager according to the requirements of an application. In some examples, the virtual devices are grouped, created, determined, or segmented according to instructions from the host or are segmented in response to triggers from the host. As shown, hardware storage unit (e.g., die 120-1, 120-2, 120-5, 120-6) are segmented from the rest of the die of the non-volatile memory 115 and grouped as virtual device 130a. Die 120-7, 120-8 are segmented from the rest of the die of the non-volatile memory 115 and grouped as virtual device 130b. Die 120-n-3, 120-n-2, 120-n-1, 120-n are segmented from the rest of the die of the non-volatile memory 115 and grouped as virtual device 130n. Although die are used herein as examples of the hardware storage units, other hardware storage units such as blocks or pages can be likewise used.

Commands from the host that are targeted for a tenant corresponding to a virtual device (e.g., virtual device 130a) are performed only on the dies (e.g., die 120-1, 120-2, 120-5, 120-6) of that virtual device. For example, responsive to a write command from the host to write certain data for a tenant (or one or more volumes of the tenant) corresponding to virtual device 130a, the data is written to one or more of the die 120-1, 120-2, 120-5, 120-6. In another example, responsive to a read command from the host to read certain data for a tenant (or one or more volumes of the tenant) corresponding the virtual device 130a, the data is read from one or more of the die 120-1, 120-2, 120-5, 120-6. In some examples, a die may belong to only one virtual device to achieve separation. Accordingly, commands directed to one virtual device do not interference with operations of other virtual devices.

Figure 2A:
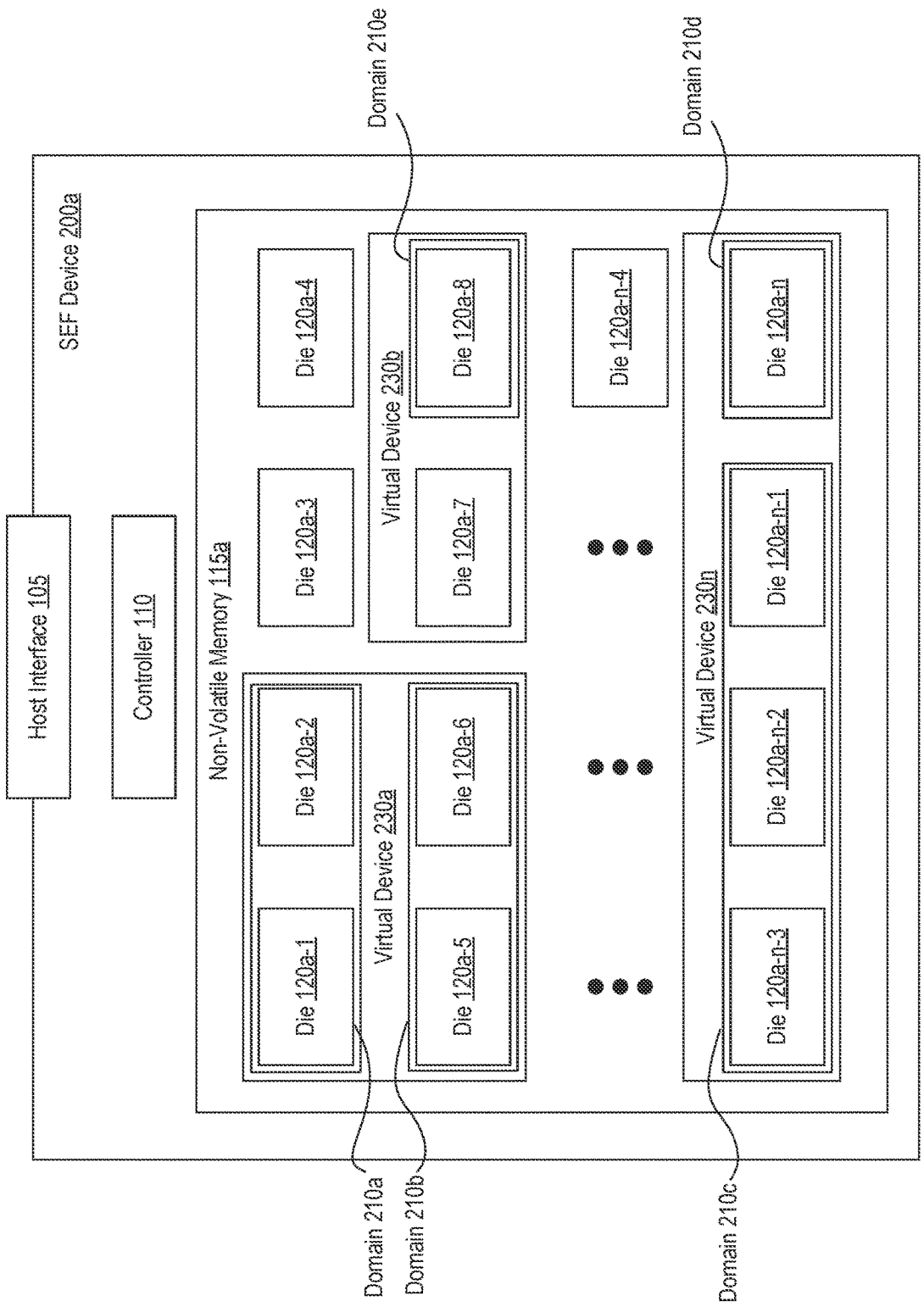
FIG. 2A is a diagram of an SEF device, according to various arrangements.
Figure 2B:
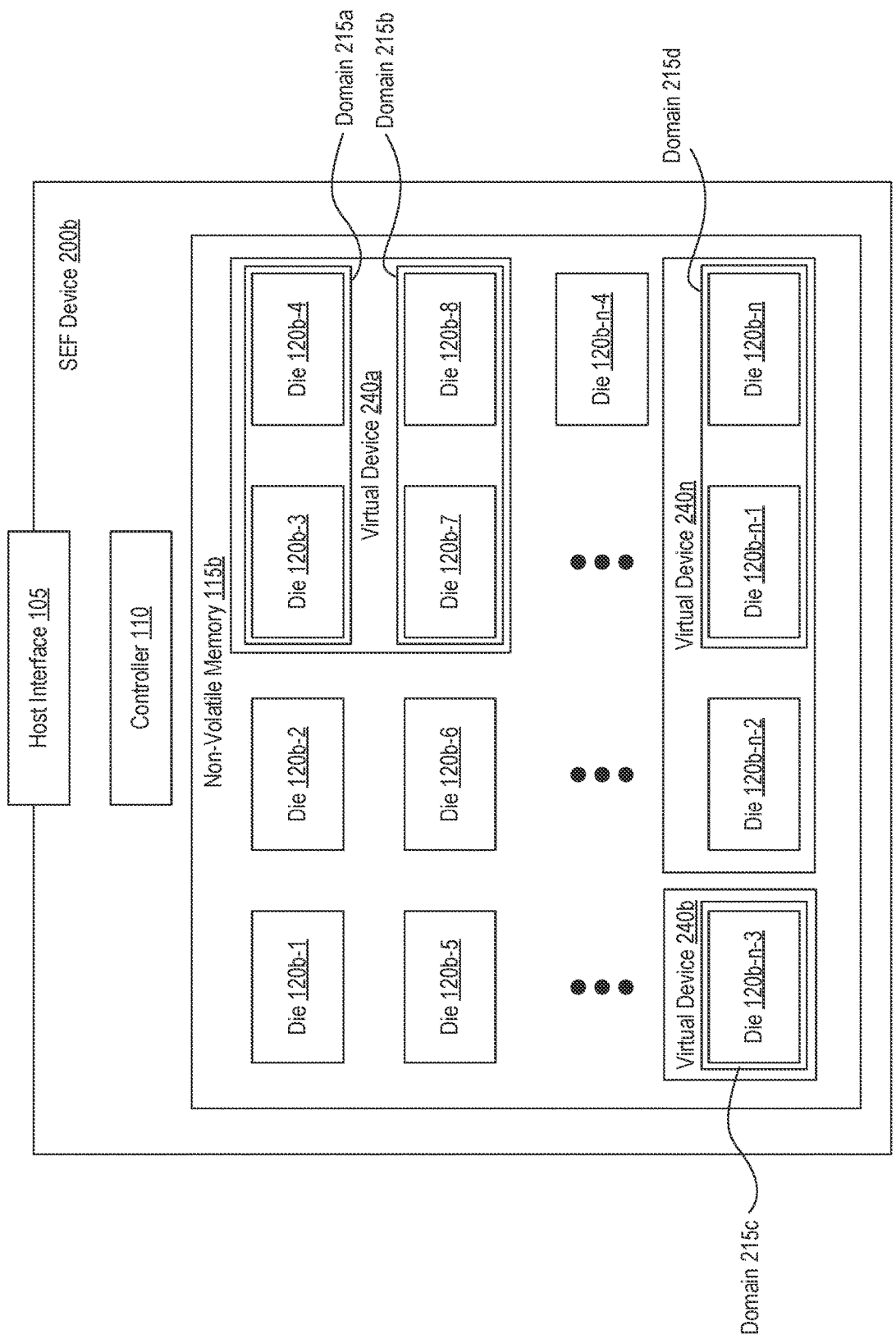
FIG. 2B is a diagram of an SEF device, according to various arrangements.

In some arrangements, each virtual device can be further segmented into at least one domain (e.g., QoS domain). In some arrangements, a domain is a memory structure abstracted from hardware storage units (e.g., die of the SEF devices) that can be defined by a manager according to the requirements of a volume, where a domain is a subdivision of a virtual device. In some examples, the domains are grouped, created, determined, or segmented according to instructions from the host or are segmented in response to triggers from the host. FIG. 2A is a diagram of an SEF device 200a, according to various arrangements. FIG. 2B is a diagram of an SEF device 200b, according to various arrangements. Each of the SEF devices 200a and 200b is a device such as but not limited to, the SEF device 100. The non-volatile memory 115a and 115b is a memory device such as the non-volatile memory 115. Each of the die 120a-1, 120a-2, . . . , 120a-n and the die 120b-1, 120b-2, 120b-n is a die such as but not limited to, the die 120-1, 120-2, . . . , 120n. Each virtual device 230a, 230b, and 230n is a virtual device such as but not limited to, the virtual devices 130a, 130b, and 130n. The dies 120a-1, 120a-2, . . . , 120a-n of SEF device 200a and the dies 120b-1, 120b-2, 120b-n of the SEF device 200b can be further segmented into domains.

As shown, die 120a-1, 120a-2 are segmented from the rest of the die of the non-volatile memory 115a and from the rest of the die of the virtual device 230a, and grouped as domain 210a. Die 120a-5, 120a-6 are segmented from the rest of the die of the non-volatile memory 115a and from the rest of the die of the virtual device 230a, and grouped as domain 210b. Die 120a-n-3, 120a-n-2, 120a-n-1 are segmented from the rest of the die of the non-volatile memory 115a and from the rest of the die of the virtual device 230n, and grouped as domain 210c. Die 120a-n is segmented from the rest of the die of the non-volatile memory 115a and from the rest of the die of the virtual device 230n, and grouped as domain 210d. Die 120a-8 is segmented from the rest of the die of the non-volatile memory 115a and from the rest of the die of the virtual device 230b, and grouped as domain 210e.

In some arrangements, the non-volatile memory 115b of the SEF device 200b can be segmented into multiple virtual devices. As shown, die 120b-3, 120b-4, 120b-7, 120b-8 are segmented from the rest of the die of the non-volatile memory 115b and grouped as virtual device 240a. Die 120b-n-3 is segmented from the rest of the die of the non-volatile memory 115b and grouped as virtual device 240b. Die 120b-n-2, 120b-n-1, 120b-n are segmented from the rest of the die of the non-volatile memory 115b and grouped as virtual device 240n.

As described, commands from the host that are targeted for a virtual device (e.g., virtual device 240a) are performed only on the dies (e.g., die 120b-3, 120b-4, 120b-7, 120b-8) of that virtual device. For example, responsive to a write command from the host to write certain data for a tenant (or one or more volumes of the tenant) corresponding to the virtual device 240a, the data is written to one or more of the die 120b-3, 120b-4, 120b-7, 120b-8. In another example, responsive to a read command from the host to read certain data for a tenant (or one or more volumes of the tenant) corresponding to the virtual device 130a, the data is read from one or more of the die 120b-3, 120b-4, 120b-7, 120b-8. In some examples, a die may belong to only one virtual device.

As shown, die 120b-3, 120b-4 are segmented from the rest of the die of the non-volatile memory 115b and from the rest of the die of the virtual device 240a, and grouped as domain 215a. Die 120a-7, 120a-8 are segmented from the rest of the die of the non-volatile memory 115b and from the rest of the die of the virtual device 240a, and grouped as domain 215b. Die 120b-n-3, is segmented from the rest of the die of the non-volatile memory 115b and from the rest of the die of the virtual device 240b, and grouped as domain 215c. Die 120b-n-1, 120b-n are segmented from the rest of the die of the non-volatile memory 115a and from the rest of the die of the virtual device 240n, and grouped as domain 215d.

In some arrangements, a tenant may have one or more hosts. A tenant may corresponds to an entity such as a company, a department within a company, a service provider, an institution, or so on. The at least one host for a tenant may each run at least one application thereon. An example application includes a software application such as a database application (e.g., Microsoft SQL Server®). The data for each tenant may be grouped into at least one volume. An example of a volume includes any suitable file. In other words, a tenant runs a group of applications, each of which may have a group of volumes. Each volume corresponds to some data for an application. An application for a tenant is translated into a virtual device, where data for the application can be stored in the same virtual device. A volume is set over a domain, where data for the volume can be stored in the same domain.

As a result, the noisy neighbor effect between applications, tenants, and volumes can be eliminated given that each application is physically separated on the NAND. In addition, applications of a same tenant can have a consistent service level (e.g., consistent latency, tail-latency, and performance, resulting in Input/Output (10) determinism), and tenants share the same QoS. The wear conditions of different physical areas (e.g., virtual device, domain) of the NAND are different, whereas the wear conditions of the same physical area are the same or similar.

In some arrangements, a management layer in a node (e.g., a storage compliance having multiple SEF devices) is implemented to manage data for tenants, applications, and volumes. In an example in which a first application running on the host includes a first volume, the first volume is mirrored across two nodes, the SEF device 200a of a first node and SEF device 200b of a second node as shown in FIGS. 2A and 2B respectively. For instance, the domain 210b of the virtual device 230a hosts the data of the first volume as one side of the mirror (referred to as first data of the first volume), and the domain 215b of the virtual device 240a hosts the data of the first volume as the other side of the mirror (referred to as second data of the first volume). Accordingly, the domains 210b and 215b store the mirrored data corresponding to the same application and the same volume where the same data is mirrored.

In an example in which a second application running on the host includes a second volume, the second volume is concatenated or striped across two nodes, the SEF device 200a of the first node and SEF device 200b of the second node. For instance, the domain 210e of the virtual device 230b hosts a first portion of the data of the second volume (referred to as first data of the second volume), and the domain 215d of the virtual device 240n hosts the second portion of the data of the second volume (referred to as second data of the second volume). Accordingly, the domain 210e and 215d stores different data corresponding to the same application and the same volume where the same data is concatenated or striped. The first application and the second application may belong to the same tenant or to different tenants.

Data for a same application can be mirrored, concatenated, or striped on two virtual devices on different nodes in a similar manner. In an example in which a first application is running on the host, the first application is mirrored across two nodes, the SEF device 200a of the first node and SEF device 200b of the second node. For instance, the virtual device 230n hosts the data of the first application as one side of the mirror (referred to as first data of the first application), and the virtual device 240n hosts the data of the first application as the other side of the mirror (referred to as second data of the first application). Accordingly, the virtual devices 230n and 240n store the mirrored data corresponding to the same application.

In an example in which a second application is running on the host, the second volume is concatenated or striped across two nodes, the SEF device 200a of the first node and SEF device 200b of the second node. For instance, the virtual device 230a hosts a first portion of the data of the second application (referred to as first data of the second application), and the virtual device 240b hosts the second portion of the data of the second application (referred to as second data of the second application). Accordingly, the virtual devices 230a and 240b store different data corresponding to the same application where the same data is concatenated or striped. The first application and the second application may belong to the same tenant or to different tenants.

Virtual devices and domains in different nodes may not have the same storage capacity, even if the domains or the virtual devices store data for the same application, volume, or tenant, regardless of mirroring of concatenation. As shown, for the second application/volume, the domain 210e has the storage capacity of one die while the domain 215d has the storage capacity of two die. This allows for flexibility in defining these virtual devices and domains based on factors specific to the applications, volumes, tenants, and the nodes. As long as the virtual devices and domains are located on separate dies assures the volume—mirrored, striped or concatenated to be with the same service level.

In some arrangements, the management layer (including a provisioner as described herein) sets the virtual devices and domains on the SEF devices of the nodes and allocates virtual devices and volumes across the nodes based on various requirements for the tenants, the applications, and the volumes. The provisioner is a software entity that enables utilizing the SEF features described herein. The provisioner entity has the knowledge of the SEF hardware devices and can activate and manage those SEF hardware devices. In some examples, the provisioner maps the tenants, the applications, and the volumes to a node, a virtual device, and a domain (and associated locations or physical storage units), respectively. As noted herein, a volume or an application can be spread across various SEF devices on various nodes. Thus, the management layer, including the node-level global FTL (e.g., shown in FIG. 4), allows the cluster of nodes to appear as one storage unit to the tenants. As described in further details herein, the node-level global FTL includes a virtual device mapping that maps an application to one or more virtual devices (e.g., the dies, the SEFs, and the nodes corresponding to the virtual devices). The node-level global FTL further includes a domain mapping that maps a volume to one or more domains (e.g., the dies, the SEFs, and the nodes corresponding to the domains).

Figure 3:
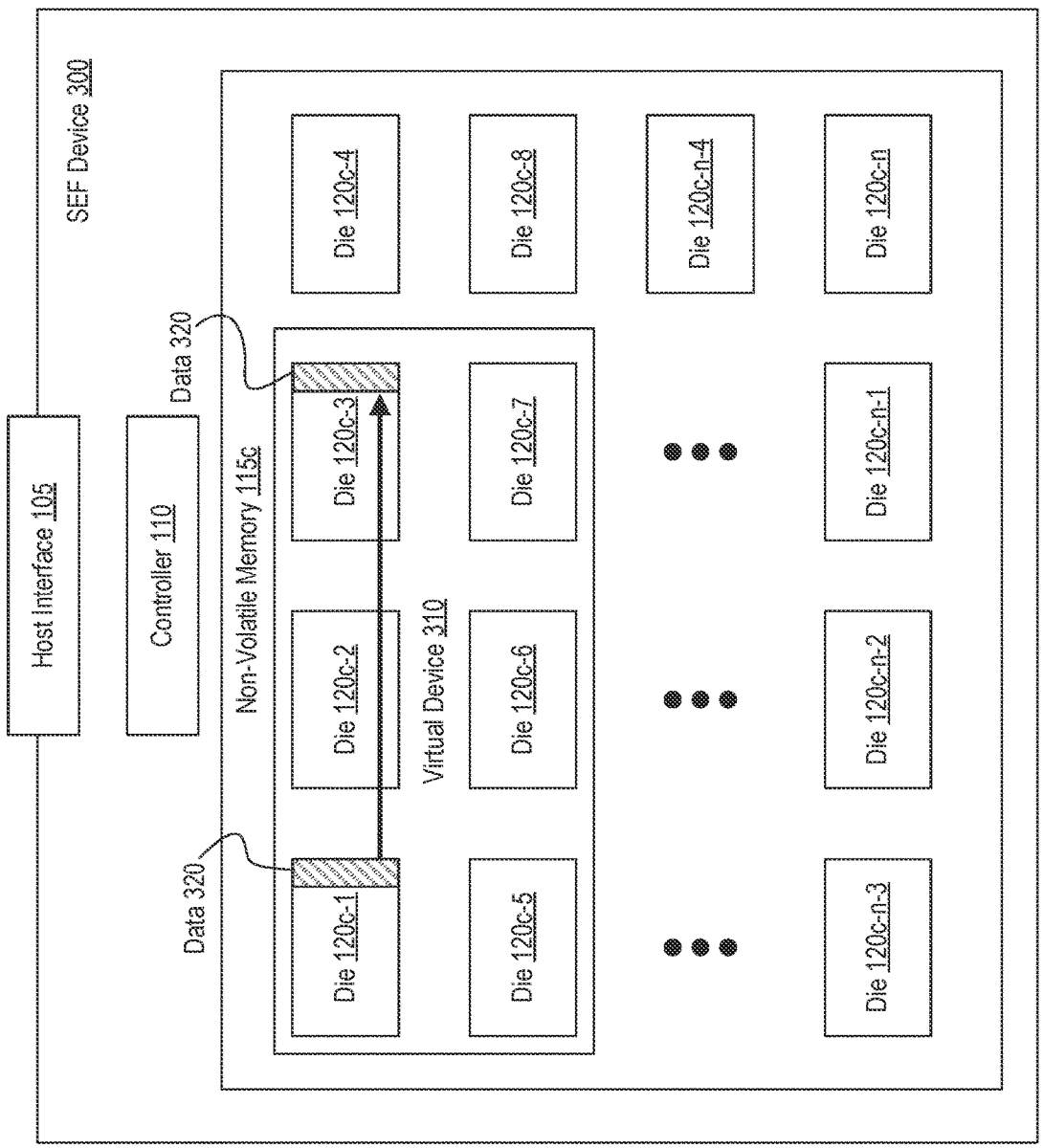
FIG. 3 is a diagram of an SEF device, according to various arrangements.

In addition, the controller 110 can perform internal transfer of data within virtual device. FIG. 3 is a diagram of an SEF device 300, according to various arrangements. The SEF devices 300 is a device such as but not limited to, the SEF device 100. The non-volatile memory 115c is a memory device such as the non-volatile memory 115. Each of the die 120c-1, 120c-2, ..., 120c-n is a die such as but not limited to, the die 120-1, 120-2, ..., 120n. In some arrangements, the non-volatile memory 115c of the SEF device 200c can be segmented into multiple virtual devices. As shown, die 120c-1, 120c-2, 120c-3, 120c-5, 120c-6, 120c-7 are segmented from the rest of the die of the non-volatile memory 115c and grouped as virtual device 310. As described, commands from the host that are targeted for a virtual device (e.g., virtual device 310) are performed only on the dies (e.g., die 120c-1, 120c-2, 120c-3, 120c-5, 120c-6, 120c-7) of that virtual device. For example, responsive to a write command from the host to write certain data for a tenant (or one or more volumes of the tenant) corresponding to the virtual device 310, the data is written to one or more of the die 120c-1, 120c-2, 120c-3, 120c-5, 120c-6, 120c-7. In another example, responsive to a read command from the host to read certain data for a tenant (or one or more volumes of the tenant) corresponding to the virtual device 310, the data is read from one or more of the die 120c-1, 120c-2, 120c-3, 120c-5, 120c-6, 120c-7.

In some arrangements, the controller 110 can transfer data 320 from the die 120c-1 to the die 120c-3. Both the die 120c-1 and 120c-3 are in the same virtual device 310. For example, the controller 110 can read the data 320 from the physical locations in the die 120c-1 into a read buffer of the controller 110, and transfer the data 320 from the read buffer to physical locations in the die 120c-3. The controller 110 can mark the physical locations in the die 120c-1 as invalid and ready for garbage collection.

In some arrangements, a copy-on-write operation is enabled by creating a QoS/replication domain (e.g., a domain intended to be used for data that is replaced) in a SEF device by a provisioner (as described herein) to perform copy-on-write. In response to receiving a write command to the a first domain (e.g., a QoS/replication domain) of a first SEF device, the currently existing data in the domain is written to a second domain of a second SEF device. Only after completing this write transaction, the first SEF device writes the new data associated with the write command to the domain of the first SEF device. Accordingly, the extensive write transactions associated with maintaining a snapshot volume can be implement in hardware without CPU intervention. This copy-on-write operation does not involve the host, and is an automatic process as long as the provisioner sets up the domain to be a QoS/replication domain. In particular, the provisioner can allocate both the first domain of the first SEF device and the second domain of the second SEF device to be mapped to each other.

In some arrangements, the management layer allocates snapshots and clones over the same virtual device or the same domain to offload the copy-on-write to each volume's snapshot and clone. Thus, providing both service level in a volume/tenant level and accelerates copy-on-write without any host intervention In a datacenter implementation, nodes can be connected via network-storage protocol (e.g., NVM Express over Fabrics (NVMe-oF), Internet Small Computer System Interface (iSCSI), and so on) over a network to hosts or remote hosts to integrate the node capabilities into appliances in the datacenter.

Figure 4:
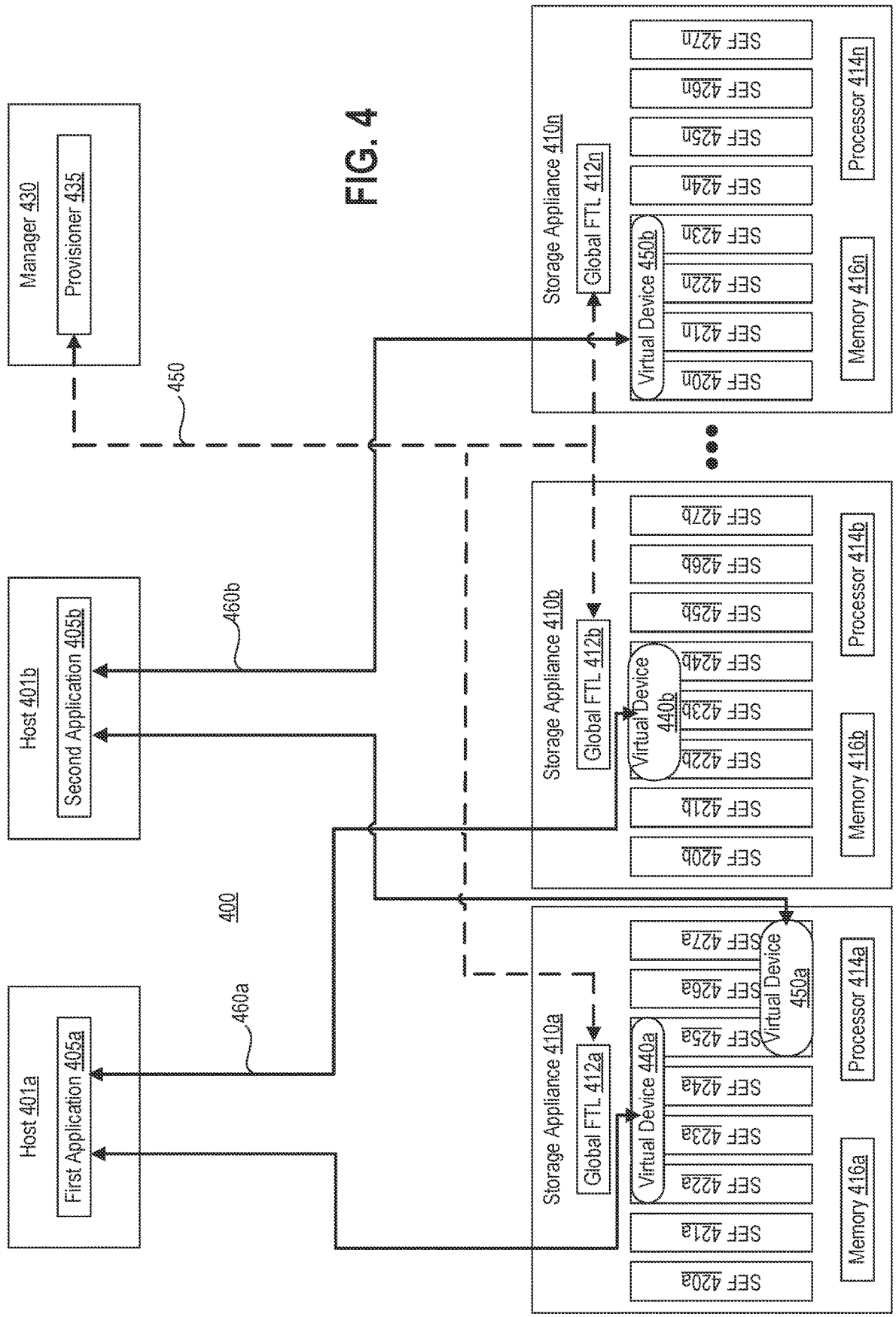
FIG. 4 is a diagram illustrating a storage system according to various arrangements and managed by a software entity (such as provisioner).

FIG. 4 is a diagram illustrating a storage system 400 according to various arrangements. An example of the storage system 400 includes a datacenter. The storage system 400 includes storage appliances 410a, 410b, ..., and 410n (referred to as the storage layer), hosts 401a and 401b, and a manager 430. In some examples, the storage system 400 provides a cluster of nodes (e.g., the storage appliances 410a, 410b, ..., and 410n), where each node has multiple SEF devices. The SEF devices are managed by the provisioner software entity 435.

Each of the storage appliances 410a, 410b, ..., and 401n can be a platform, cabinet, or rack supports one or more storage devices (such as but not limited to, the SEFs 420a-427a, 420b-427b, 420n-427n). Each of the SEFs 420a-427a, 420b-427b, 420n-427n can be an SEF such as but not limited to, the SEFs 100, 200a, 200b, and 300. In some implementations, the SEFs within a storage appliance are connected to a network device (e.g., a Top of Rack (TOR) switch) and can communicate with each other (e.g., transfer data) via the network device. In some implementations, the network device of the storage appliance includes at least one router to allow SEFs within a storage appliance to communicate other storage appliance (e.g., the SEFs therein), the manager 430, and the hosts 401a and 401b. In some examples, the network fabric that connects the storage appliances 410a, 410b, . . . , and 401n, the hosts 401a and 401b, and the manager 430 is network such as Ethernet or a wireless network. Each of the storage appliances 410a, 410b, . . . , and 401n includes a processor 414a and memory 416a to perform the functions of a storage appliance as described herein. In some example, each of the storage appliances 410a, 410b, . . . , and 401n is a node of the system 400.

Each of the hosts 401a and 401b have suitable processing and memory capabilities (e.g., at least one processor and at least one memory) to perform the functions of the hosts 410a and 401b. As shown, the host 401a has a first application 405a running thereon, and the host 401b has a second application 405b running thereon. Each of the hosts 401a and 401b can be a computing device or server. The hosts 401a and 401b may be for a same tenant or different tenants.

The manager 430 is a computing device or server that has suitable processing and memory capabilities (e.g., at least one processor and at least one memory) to perform the functions of the manager 430. The manager 430 has a provisioner 435 which is a software entity can reside at this layer, to enable utilizing the SEF features mentioned above. The provisioner entity has the knowledge of the SEF hardware devices and can activate and manage those SEF hardware devices.

In some examples, the manager 430 (e.g., the provisioner 435) maps the tenants, the applications, and the volumes to a node, a virtual device, and a domain (and associated locations or physical storage units), respectively.

For example, the provisioner 435 can spread a tenant, an application, or a volume application across multiple SEF devices in a node (e.g., with the same QoS requirement) by creating at least one virtual device and/or domain over the multiple SEF devices in the node. Whereas a virtual device or domain created for a given SEF is a collection or grouping of dies in the non-volatile memory 115 of that SEF, a virtual device or domain created over multiple SEFs is a collection or grouping of at least one die in the non-volatile memory 115 in each of those SEFs.

As shown, the provisioner 435 can spread the first application 405a by creating a virtual device 440a corresponding to the first application 405a over the SEFs 422a, 423a, 424a, and 425a of a node (e.g., the storage appliance 410a). In some examples, the virtual device 440a over the SEFs 422a, 423a, 424a, and 425a include a constituent virtual device in each of the SEFs 422a, 423a, 424a, and 425a. The constituent virtual device in each of the SEFs can be a virtual device such as but not limited to, the virtual devices 130a, 130b, 130n, 230a, 230b, 230n, 230a, 230b, 230n, and 310. In some examples, the virtual device 440a over the SEFs 422a, 423a, 424a, and 425a includes one or more designated dies in each of the SEFs 422a, 423a, 424a, and 425a.

The provisioner 435 can spread the second application 405b by creating another virtual device 450a corresponding to the second application 405b over the SEFs 425a, 426a, and 427a of the node (e.g., the storage appliance 410a). In some examples, the virtual device 450a over the SEFs 425a, 426a, and 427a include a constituent virtual device in each of the SEFs 425a, 426a, and 427a. The constituent virtual device in each of the SEFs can be a virtual device such as but not limited to, the virtual devices 130a, 130b, 130n, 230a, 230b, 230n, 230a, 230b, 230n, and 310. In some examples, the virtual device 450a over the SEFs 425a, 426a, and 427a includes one or more designated dies in each of the SEFs 425a, 426a, and 427a.

For a virtual device spread across SEFs of the same node, the constituent virtual devices in the SEFs may have a same size or capacity (e.g., a same number of dies with the same die capacity) in some examples. In other examples, the constituent virtual devices in the SEFs of a virtual device spread across SEFs of the same node may have different sizes or capacities (e.g., a same number of dies with different die capacities or a different number of dies).

The data can be spread over the virtual devices 440a and 450a (or domains thereof) spanning multiple SEFs of the same node via striping, concatenating, and mirroring. For example, the data stored in the constituent virtual devices, domains, or the designated dies of the SEFs making up the virtual device 440a is striped, concatenated, mirrored over the constituent virtual devices of the same node. The data stored in the constituent virtual devices, domains, or the designated dies of the SEFs making up the virtual device 450a is striped, concatenated, mirrored over the constituent virtual devices of the same node.

Moreover, the provisioner 435 can spread a tenant, an application, or a volume across multiple SEF devices in different nodes (e.g., with the same QoS requirement) by creating at least one virtual device and/or domain over the multiple SEF devices in the different nodes. Whereas a virtual device or domain created for a node including SEFs that are a collection or grouping of dies in the non-volatile memory 115 of those SEFs in that same node, a virtual device or domain created over multiple SEFs in multiple nodes (e.g., different storage appliances) is a collection or grouping of die in the non-volatile memory 115 in those SEFs in different nodes.

As shown, the provisioner 435 can spread the first application 405a by creating, in addition to the virtual device 440a, a virtual device 440b corresponding to first application 405a over the SEFs 422b, 423b, and 424b of a node (e.g., the storage appliance 410b) different from the node on which the virtual device 440a is located. In some examples, the virtual device 440b over the SEFs 422b, 423b, and 424b include a constituent virtual device in each of the SEFs 422b, 423b, and 424b. The constituent virtual device in each of the SEFs 422b, 423b, and 424b can be a virtual device such as but not limited to, the virtual devices 130a, 130b, 130n, 230a, 230b, 230n, 230a, 230b, 230n, and 310. In some examples, the virtual device 440b over the SEFs 422b, 423b, and 424b includes one or more designated dies in each of the SEFs 422b, 423b, and 424b.

In some examples, the virtual devices 440a and 440b can referred to as different portions or parts of a same virtual device residing on multiple nodes (e.g., storage appliances 410a and 410b). In that regard, the designated dies in the SEFs in the different nodes are grouped to the same virtual device.

The provisioner 435 can spread the second application 405b by creating, in addition to the virtual device 450a, another virtual device 450b corresponding to the second application 405b over the SEFs 420n, 421n, 422n, and 423n of another node (e.g., the storage appliance 410n) different from the node on which the virtual device 450a is located. In some examples, the virtual device 450b over the SEFs 420n, 421n, 422n, and 423n include a constituent virtual device in each of the SEFs 420n, 421n, 422n, and 423n. The constituent virtual device in each of the SEFs can be a virtual device such as but not limited to, the virtual devices 130a, 130b, 130n, 230a, 230b, 230n, 230a, 230b, 230n, and 310. In some examples, the virtual device 450b over the SEFs 420n, 421n, 422n, and 423n includes one or more designated dies in each of the SEFs 420n, 421n, 422n, and 423n.

In some examples, the virtual devices 450a and 450b can referred to as different portions or parts of a same virtual device residing on multiple nodes (e.g., storage appliances 410a and 410n). In that regard, the designated dies in the SEFs in the different nodes are grouped to the same virtual device.

For a virtual device (e.g., the virtual device including the virtual devices 440a and 440b, the virtual device including the virtual devices 450a and 450b) spread across SEFs of different nodes, the constituent virtual devices in the SEFs making up such virtual device may have a same size or capacity (e.g., a same number of SEFs, a same number of dies with the same die capacity) in some examples. In other examples, the constituent virtual devices in the SEFs may have different sizes or capacities (e.g., one or more of a different number of SEFs, a different number of dies, or different size or die capacity each die).

The data can be spread over the virtual device (or domain thereof) spanning multiple SEFs in multiple nodes via striping, concatenating, and mirroring. For example, the data stored in the constituent virtual devices, domains, or the designated dies of the SEFs making up the virtual device that includes virtual devices 440a and 440b are striped, concatenated, mirrored. The data stored in the constituent virtual devices, domains, or the designated dies of the SEFs making up the virtual device that includes the virtual devices 450a and 450b are striped, concatenated, mirrored.

In some examples, the provisioner 435 is in the control path 450, shown in dashed lines for clarity. The control path 450 is different from the data paths such as the data path 460a for the first application 405a and the host 401a, and the data path 460b for the second application 405b and the host 401b.

In some examples, the provisioner 435 and the manager 430 are network-aware. A host (e.g., 401a or 401b) may be remote to the storage appliances 410a, 410b, . . . , 410n and the manager 430 and is connected to the storage appliances 410a, 410b, . . . , 410n and the manager 430 via a network. The host communicates with storage appliances 410a, 410b, . . . , 410n and the SEFs therein over network through a network switch, for example. A driver encapsulates an open-channel Application Program Interface (API) that allows the host to communicate with the SEFs 420a-427a, 420b-427b, . . . and 420n-427n. The manager 430 communicates with devices over the network through the network switch. A driver encapsulates an open-channel API that allows the manager 430 to communicate with the SEFs 420a-427a, 420b-427b, . . . and 420n-427n.

Figure 5:
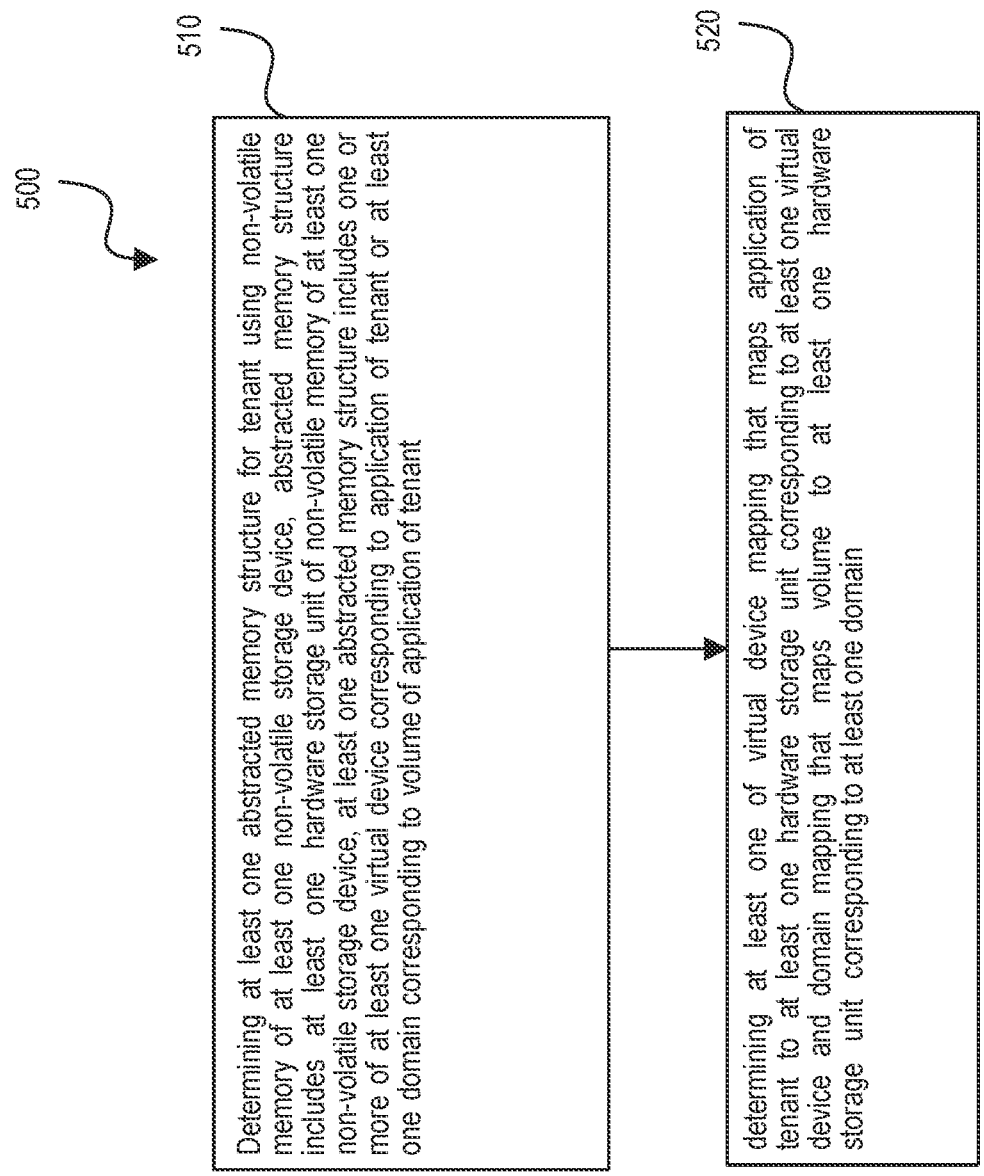
FIG. 5 is a method for creating and managing abstracted memory structure from non-volatile storage devices, according to various arrangements.

FIG. 5 is a method 500 for creating and managing abstracted memory structure from non-volatile storage devices, according to various arrangements. In some arrangements, the method 500 can be performed by the manager 430 (including the provisioner 435). In some examples, a tenant operates the hosts 401a and 401b, which respectively runs the first application 405a and 405b.

At 510, the manager 430 determines at least one abstracted memory structure (e.g., virtual device or domain) for a tenant using the non-volatile memory 115 of at least one non-volatile storage device (e.g., the SEF devices). The abstracted memory structure includes at least one hardware storage unit (e.g., die) of the non-volatile memory 115 of the at least one non-volatile storage device. The at least one abstracted memory structure includes one or more of at least one virtual device corresponding to an application of the tenant or at least one domain corresponding to a volume of the application of the tenant.

In some examples, the manager 430 allocates at least one node for the tenant based on requirements of the tenant. Each of the at least one node (e.g., a storage appliance) includes one or more of the least one non-volatile storage device. The requirements of the tenant can be received from the host 401a and/or 401b. In some arrangements, the requirements of the tenant includes a required capacity and storage type (e.g., replication, mirroring, concatenation, striping, and so on). The manager 430 allocates at least one node with a total available capacity equal to or exceeding the required capacity of the tenant. If available capacity of one node is not sufficient and the storage type allows for concatenation or striping, one or more additional nodes are allocated for the tenant until the tenant's requirement is met. In an example in which the tenant requires two TBs of capacity, the aggregate available capacity of the allocated nodes must be two TBs or above. In the example in which the storage type is replication or mirroring, additional capacity in the nodes should be considered to account for replication and mirroring. In particular, two times the required size is needed if the replication or mirroring is to be performed on at least once.

In some arrangements, the at least one hardware storage unit includes at least one die of the non-volatile memory of each of the at least one non-volatile storage device. Each of the at least one virtual device includes the at least one die of the non-volatile memory of each of the at least one non-volatile storage device. Determining the at least one abstracted memory structure using the non-volatile memory of the at least one non-volatile storage device includes determining the at least one die of the non-volatile memory of each the at least one non-volatile storage device for the application the tenant based on requirements of the application.

In some arrangements, the requirements of the application includes required capacity of the application and replication characteristics. The manager 430 allocates at least one virtual device with a total available capacity (total die capacity of the die making up the virtual device) equal to or exceeding the required capacity of the application. If available capacity of one virtual device is not sufficient and concatenation or striping is allowed, the manager 430 may include additional die on the same SEF devices of the same node, or additional die of SEF devices of different node, until the application's requirement is met. In an example in which the application requires one TB of capacity, the aggregate available capacity of the allocated at least one virtual device must be one TB or above. In the example in which the replication characteristics require replication or mirroring, additional capacity in the virtual devices should be considered to account for replication and mirroring. In particular, the manager 430 can allocated additional virtual devices in the same node if data is to be replicated or mirror to virtual devices in the same node, in some examples. In other examples, the manager 430 can allocated additional virtual devices in a different node if data is to be replicated or mirrored to virtual devices in a different node.

In some arrangements, each of one or more of the at least one virtual device includes one or more of the at least one domain. Each of the at least one domain includes one or more of the at least one die of the non-volatile memory of each of the at least one non-volatile storage device. Determining the at least one abstracted memory structure using the non-volatile memory of the at least one non-volatile storage device includes determining the one or more of the at least one die of the non-volatile memory of each the at least one non-volatile storage device for the volume of the application of the tenant based on requirements of the volume.

In some examples, the requirements of the volume comprises required capacity of the volume and storage class. In some examples, storage classes define the attributes of storage based on certain parameters, such as Input/Output Operations Per Second (IOPs), latency, capacity, and so on for the volume. The storage class can instruct the provisioner 435 the type or range of Service Level Agreement (SLA) or QoS is required, and the provisioner 435 can then implement this storage request on the underlying hardware layer. By selecting appropriate dies in the SEF devices of one or more nodes that match the SLA and QOS required for the particular volume. Allocation of volume based on storage class is further described in U.S. Pat. No. 11,169,726 by Yaron Klein, titled "POOL-LEVEL STORAGE MANAGEMENT," the entire content of which is incorporated herein by reference in its entirety.

In some arrangements, the at least one node includes two or more nodes. Each of the two or more nodes includes one or more of the at least one non-volatile storage device. In some arrangements, a first virtual device of the at least one virtual device is determined using the one or more of the at least one non-volatile storage device of a first node of the two or mode nodes. A second virtual device of the at least one virtual device is determined using the one or more of the at least one non-volatile storage device of a second node of the two or mode nodes. In some arrangements, a virtual device of the at least one virtual device is determined using the one or more of the at least one non-volatile storage device of a first node of the two or mode nodes and the one or more of the at least one non-volatile storage device of a second node of the two or mode nodes.

In some arrangements, the at least one virtual device includes two virtual devices. the at least one non-volatile storage device includes two non-volatile storage devices. A first virtual device is determined using a first non-volatile storage device of the two non-volatile storage devices. A second virtual device is determined using a second non-volatile storage device of the two non-volatile storage devices. In some examples, the two non-volatile storage devices are on a same node. In some examples, the two non-volatile storage devices are on different nodes.

In some examples, data stored on the two virtual devices are concatenated. In some examples, data stored on the two virtual devices are mirrored. In some examples, data stored on the two virtual devices are striped.

In some examples, the manager 430 can indicate to a first non-volatile storage device (e.g., the SEF device 300) of the at least one non-volatile storage device, that data corresponding to a first virtual device (e.g., the virtual device 310) of the at least one virtual device stored in a first location (e.g., the die 120c-1) of the first virtual device is to be copied to a second location (e.g., the die 120c-3) of the first virtual device in response to storing the data in the first location.

At 520, the manger 430 determines (and maintains) at least one of a virtual device mapping that maps the application of the tenant to the at least one hardware storage unit corresponding to the at least one virtual device or a domain mapping that maps the volume to the at least one hardware storage unit corresponding to the at least one domain.

In some examples, data corresponding to the application is stored in or read from the at least one hardware storage unit corresponding to the at least one virtual device using the virtual device mapping. In some examples, data corresponding to the volume is stored in or read from the at least one hardware storage unit corresponding to the at least one domain using the domain mapping.

In some arrangements, once the nodes, the virtual devices, and the domains are determined per 510, the manager 430 maps the tenants, the applications, and the volumes to the nodes, the virtual devices, and the domains, and maintain such mapping (e.g., the node mapping, the virtual device mapping, and the domain mapping). The provisioner 435 provides such mapping to the global FTL 410a, 410b, and 410n in each of the storage appliances 410a, 410b, and 410n respectively.

In some examples, each node (e.g., a storage application) can be identified by a node identifier such as an Internet Protocol (IP) address, a Uniform Resource Locator (URL), Uniform Resource Identifier (URI), or another suitable network identifier. In some examples, each SEF device can be identified by a SEF device identifier such as IP address, a URL, URI, or another suitable network identifier. Alternatively, each SEF device can be identified by an index number that distinguishes the SEF devices within the node. In some examples, each die of a SEF device can be identified by a die identifier such as IP address, a URL, URI, or another suitable network identifier. Alternatively, each die can be identified by an index number that distinguishes the die within a SEF device or a node. In other examples, each die can be identified by its physical address within a SEF device.

In some examples, the node mapping maps the node identifier of each associated node to a tenant. In some examples, the virtual device mapping maps the SEF device identifier of each associated SEF device and the die identifier of each associated die to a virtual device. In some examples, the domain mapping maps the SEF device identifier of each associated SEF device and the die identifier of each associated die to a volume. In some examples, the global FTL 410a, 410b, and 410n includes a mapping table that includes all of the node mapping, the virtual device mapping, and the domain mapping.

The provisioner 435 can also report to the hosts 401a and 401b the identifying information of the virtual device or domain, such as the SEF device identifier of each associated SEF device and the die identifier of each associated die of the virtual device or domain. The hosts 401a and 401b can communicate directly with the SEF devices using the node identifier, SEF device identifier, and die identifier to perform operations (e.g., read and write) via the data paths 460a and 460b (via the network), without having to use logical address as conventionally performed. As such, No FTL is performed at the host level or at the SEF level.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storages, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method, comprising:
   determining, by a manager, an abstracted memory structure for a tenant using a non-volatile memory of at least one non-volatile storage device,
   wherein the abstracted memory structure comprises a plurality of hardware storage units of the non-volatile memory of the at least one non-volatile storage device, the abstracted memory structure comprises one of:
  a plurality of virtual devices corresponding to an application a plurality of applications of the tenant; and
  a plurality of domains corresponding to a plurality of volumes of the applications of the tenant, wherein the volumes comprise data used by the applications of the tenant; and
determining, by the manager:
  a virtual device mapping that maps the applications of the tenant to the plurality of hardware storage units corresponding to the plurality of virtual devices; and
  a domain mapping that maps the volumes comprising the data used by the applications of the tenant to the plurality of hardware storage units corresponding to the plurality of domains, wherein a first one of the plurality of volumes for a first application is mapped to a first one of the plurality of hardware storage units corresponding to a first one of the plurality of domains, and a second different one of the plurality of volumes for a second different one of the plurality of applications is mapped to a second different one of the plurality of hardware storage units corresponding to a second different one of the plurality of domains.

2. The method of claim 1, further comprising allocating, by the manager, at least one node for the tenant based on requirements of the tenant, wherein each of the at least one node comprises one or more of the least one non-volatile storage device.

3. The method of claim 2, wherein the requirements of the tenant comprises at least one of required capacity of the tenant and storage type.

4. The method of claim 2, wherein
  the plurality of hardware storage units comprise at least one die of the non-volatile memory of each of the at least one non-volatile storage device;
  each of the at least one virtual device comprises the at least one die of the non-volatile memory of each of the at least one non-volatile storage device; and
  determining the abstracted memory structure using the non-volatile memory of the at least one non-volatile storage device comprises determining the at least one die of the non-volatile memory of each the at least one non-volatile storage device for the applications of the tenant based on requirements of the applications.

5. The method of claim 4, wherein the requirements of the applications comprises required capacity of the applications and replication characteristics.

6. The method of claim 4, wherein
  each of one or more of the at plurality of virtual devices comprises one or more of the plurality of domains;
  each of the plurality of domains comprise one or more of the at least one die of the non-volatile memory of each of the at least one non-volatile storage device; and
  determining the abstracted memory structure using the non-volatile memory of the at least one non-volatile storage device comprises determining the one or more of the at least one die of the non-volatile memory of each the at least one non-volatile storage device for the volumes of the applications of the tenant based on requirements of the volumes.

7. The method of claim 6, wherein the requirements of the volumes comprises required capacity of the volume and storage class.

8. The method of claim 2, wherein
  the at least one node comprises two or more nodes; and
  each of the two or more nodes comprises one or more of the at least one non-volatile storage device.

9. The method of claim 8, wherein
  a first one of the plurality of virtual devices is determined using the one or more of the at least one non-volatile storage device of a first node of the two or mode nodes; and
  a second one of the plurality of virtual devices is determined using the one or more of the at least one non-volatile storage device of a second node of the two or mode nodes.

10. The method of claim 8, wherein a first one of the plurality of virtual devices is determined using the one or more of the at least one non-volatile storage device of a first node of the two or mode nodes and the one or more of the at least one non-volatile storage device of a second node of the two or mode nodes.

11. The method of claim 1, wherein
  the at least one non-volatile storage device comprises two non-volatile storage devices;
  a first one of the plurality of virtual devices is determined using a first non-volatile storage device of the two non-volatile storage devices; and
  a second one of the plurality of virtual devices is determined using a second non-volatile storage device of the two non-volatile storage devices.

12. The method of claim 11, wherein the two non-volatile storage devices are on a same node.

13. The method of claim 11, wherein the two non-volatile storage devices are on different nodes.

14. The method of claim 11, wherein data stored on the first and second virtual devices are concatenated.

15. The method of claim 11, wherein data stored on the first and second virtual devices are mirrored.

16. The method of claim 11, wherein data stored on the first and second virtual devices are striped.

17. The method of claim 1, further comprising indicating, by the manager to a first non-volatile storage device of the at least one non-volatile storage device, that data corresponding to a first one of the plurality of virtual devices stored in a first location of the first virtual device is to be copied to a second location of the first virtual device in response to storing the data in the first location.

18. The method of claim 1, wherein data corresponding to the first application is stored in or read from the first hardware storage unit corresponding to a first one of the plurality of virtual devices using the virtual device mapping.

19. The method of claim 1, wherein data corresponding to the first volume is stored in or read from the first hardware storage unit corresponding to the first domain using the domain mapping.

20. At least one non-transitory computer-readable medium comprising computer-readable instructions, such that, when executed, by a processor, causes the processor to:
  determine an abstracted memory structure for a tenant using a non-volatile memory of non-volatile storage device,
  wherein the abstracted memory structure comprises a plurality of hardware storage units of the non-volatile memory of the at least one non-volatile storage device, the abstracted memory structure comprises one of:
    a plurality of virtual devices corresponding to a plurality of applications of the tenant; and
    a plurality of domains corresponding to a plurality of volumes of the applications of the tenant, wherein the volumes comprise data used by the applications of the tenant; and determine a virtual device mapping that maps the applications of the tenant to the plurality of hardware storage units corresponding to the plurality of virtual devices; and determine a domain mapping that maps the volumes comprising the data used by the applications of the tenant to the plurality of hardware storage units corresponding to the plurality of domains, wherein a first one of the plurality of volumes for a first application is mapped to a first one of the plurality of hardware storage units corresponding to a first one of the plurality of domains, and a second different one of the plurality of volumes for a second different one of the plurality of applications is mapped to a second different one of the plurality of hardware storage units corresponding to a second different one of the plurality of domains.

21. A manager communicably coupled to at least one non-volatile storage device, comprising:

a processing circuit configured to:

determine an abstracted memory structure for a tenant using a non-volatile memory of the at least one non-volatile storage device, wherein the abstracted memory structure comprises a plurality of hardware storage units of the non-volatile memory of the at least one non-volatile storage device, the abstracted memory structure comprises one of:

a plurality of virtual devices corresponding to a plurality of applications of the tenant; and a plurality of domains corresponding to a plurality of volumes of the applications of the tenant, wherein the volumes comprise data used by the applications of the tenant; and determine a virtual device mapping that maps the applications of the tenant to the plurality of hardware storage units corresponding to the plurality of virtual devices; and determine a domain mapping that maps the volumes comprising the data used by the applications of the tenant to the plurality of hardware storage units corresponding to the plurality of domains, wherein a first one of the plurality of volumes for a first application is mapped to a first one of the plurality of hardware storage units corresponding to a first one of the plurality of domains, and a second different one of the plurality of volumes for a second different one of the plurality of applications is mapped to a second different one of the plurality of hardware storage units corresponding to a second different one of the plurality of domains.

* * * * *